United States Patent
Thiruvengada et al.

(10) Patent No.: US 9,885,492 B2
(45) Date of Patent: Feb. 6, 2018

(54) METHODS SYSTEMS AND TOOLS FOR DETERMINING A WIRING CONFIGURATION FOR AN HVAC CONTROLLER

(71) Applicant: Honeywell International Inc., Morristown, NJ (US)

(72) Inventors: Hari Thiruvengada, Plymouth, MN (US); Patrick Tessier, Maple Grove, MN (US); Heidi Finch, Champlin, MN (US)

(73) Assignee: Honeywell International Inc., Morris Plains, NJ (US)

( * ) Notice: Subject to any disclaimer, the term of this patent is extended or adjusted under 35 U.S.C. 154(b) by 972 days.

(21) Appl. No.: 14/088,292

(22) Filed: Nov. 22, 2013

(65) Prior Publication Data

US 2015/0144705 A1    May 28, 2015

(51) Int. Cl.
| | | |
|---|---|---|
| *G05D 23/00* | (2006.01) | |
| *G01K 13/00* | (2006.01) | |
| *F25B 45/00* | (2006.01) | |
| *G05B 15/00* | (2006.01) | |
| *G05B 19/42* | (2006.01) | |
| *F24F 11/00* | (2006.01) | |
| *G05B 19/042* | (2006.01) | |

(52) U.S. Cl.
CPC ...... *F24F 11/0086* (2013.01); *G05B 19/0423* (2013.01); *F24F 2011/0071* (2013.01); *G05B 2219/21086* (2013.01); *G05B 2219/25471* (2013.01); *G05B 2219/2614* (2013.01); *G05B 2219/32126* (2013.01)

(58) Field of Classification Search
CPC ...... F24F 2011/0071; F24F 2011/0091; G05B 2219/25471; G05B 2219/2614; G05D 23/1919
USPC ............. 236/51, 94; 62/77, 129; 700/83, 86; 702/119; 716/102, 103
See application file for complete search history.

(56) References Cited

U.S. PATENT DOCUMENTS 5,065,813 A * 11/1991 Berkeley ............ G05D 23/1917
165/11.1
5,161,606 A * 11/1992 Berkeley .............. F24F 11/0012
165/11.1

(Continued)

FOREIGN PATENT DOCUMENTS

WO    2013052389    4/2013

OTHER PUBLICATIONS

Honeywell Quick Installation Guide, 2011.*

(Continued)

*Primary Examiner* — Henry Crenshaw
(74) *Attorney, Agent, or Firm* — Seager, Tufte & Wickhem, LLP

(57) ABSTRACT

A wiring configuration tool may be configured to determine a new wiring configuration for a replacement HVAC controller based, at least in part, on the existing wiring configuration for a current HVAC controller and, for example, the make and model of the replacement HVAC controller. The wiring configuration tool may be hosted by a server that provides a user interface for interacting with the user. The user may access the wiring configuration tool via a web services interface, a smart phone application or in any other suitable manner.

23 Claims, 15 Drawing Sheets

(56) References Cited

U.S. PATENT DOCUMENTS

| | | | |
|---|---|---|---|
| 5,237,826 A * | 8/1993 | Baldwin | F24F 3/044 174/72 A |
| 6,721,879 B1 * | 4/2004 | Tanaka | G06F 1/24 713/1 |
| 7,383,158 B2 | 6/2008 | Krocker et al. | |
| 8,523,083 B2 | 9/2013 | Warren et al. | |
| 2002/0147561 A1 * | 10/2002 | Baracat | G01B 31/318307 702/119 |
| 2003/0006779 A1 * | 1/2003 | Youval | G06F 17/509 324/503 |
| 2003/0058083 A1 * | 3/2003 | Birchfield | B60R 25/104 340/5.22 |
| 2003/0079197 A1 * | 4/2003 | Pannala | G06F 17/509 716/102 |
| 2007/0157639 A1 * | 7/2007 | Harrod | F24F 11/0086 62/129 |
| 2007/0221741 A1 * | 9/2007 | Wagner | F24F 11/0086 236/94 |
| 2009/0057428 A1 * | 3/2009 | Geadelmann | G05B 15/02 236/51 |
| 2009/0062964 A1 * | 3/2009 | Sullivan | G05B 15/02 700/276 |
| 2009/0064156 A1 * | 3/2009 | He | G06F 9/5066 718/104 |
| 2011/0257795 A1 * | 10/2011 | Narayanamurthy | F24F 5/0046 700/277 |
| 2012/0130679 A1 | 5/2012 | Fadell et al. | |
| 2013/0087629 A1 | 4/2013 | Stefanski et al. | |
| 2013/0099010 A1 | 4/2013 | Filson et al. | |
| 2013/0204440 A1 | 8/2013 | Fadell et al. | |

OTHER PUBLICATIONS http:support.nest.com/article/2nd-generation-Nest-Learning-Thermostat-Installation-Guide#troubleshooting, "Screen Shots," 6 pages, Nov. 8, 2013.

Honeywell, "RTH2310 Programmable Thermostat," Quick Installation Guide, 24 pages, Mar. 2011.

* cited by examiner

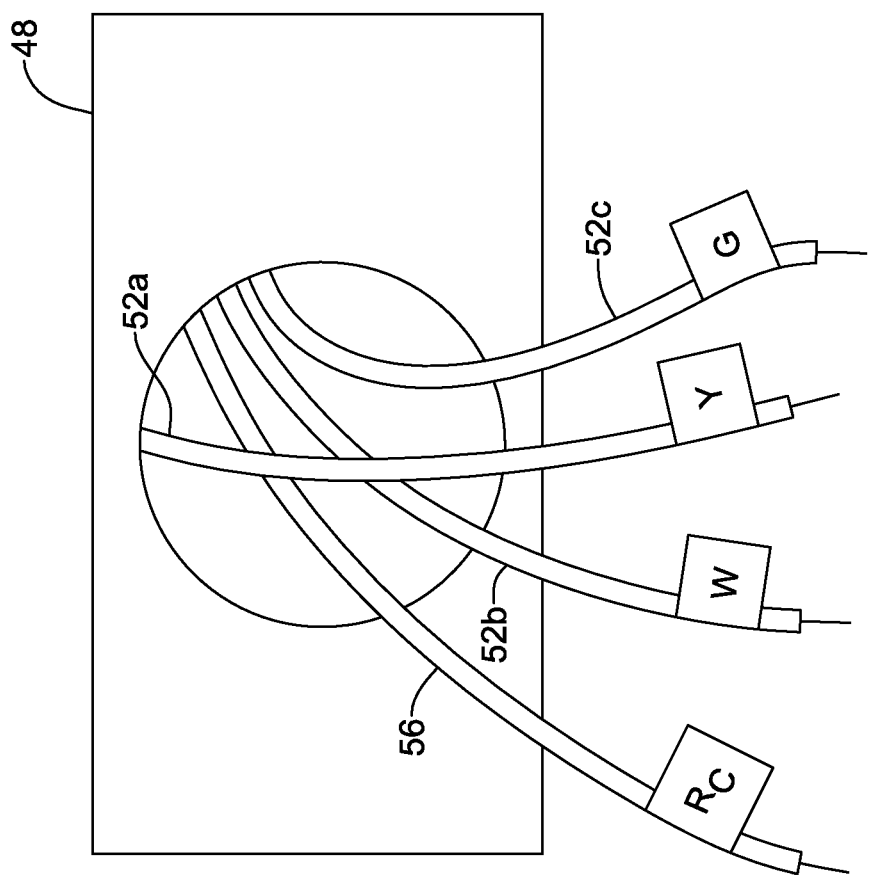

*Figure 7*

METHODS SYSTEMS AND TOOLS FOR DETERMINING A WIRING CONFIGURATION FOR AN HVAC CONTROLLER

TECHNICAL FIELD

The present disclosure relates generally to HVAC controllers, and more particularly to methods, systems and tools for aiding a user in determining a proper wiring configuration for an HVAC controller.

BACKGROUND

Heating, ventilation, and/or air conditioning (HVAC) systems are often used to control the comfort level within a building or other structure. Such HVAC systems typically include an HVAC controller (e.g. thermostat) that controls various HVAC components of the HVAC system in order to affect and/or control one or more environmental conditions within the building. Different thermostats may require different wiring configurations based on such things as the manufacturer, the type of HVAC equipment to be controlled, the particular system settings, etc. In some cases, there may be many possible thermostat wiring configurations. The selection of an appropriate wiring configuration for a particular HVAC controller will often depend on the particular HVAC equipment that is to be controlled. Because of the many factors that can affect the wiring configuration for a particular HVAC controller, a user (typically a do-it-yourself homeowner) installing a replacement HVAC Controller that is different from their previous HVAC controller may find it difficult to determine how to wire their new HVAC controller to control their existing HVAC system.

SUMMARY

The present disclosure relates generally to methods, systems and tools for aiding a user in determining a proper wiring configuration for an HVAC controller.

In an illustrative embodiment, a system may include: a communications port for communicating with a user interface; a memory storing wiring configurations for each of a plurality of current HVAC controllers, along with one or more corresponding new wiring configurations for each of a plurality of replacement HVAC controllers; and a controller operatively coupled to the communications port and the memory. In some cases, the controller can be programmed to display on the user interface a plurality of wiring terminal labels and at least two replacement HVAC controllers available for selection by a user via the user interface. In response to receiving a selection of a replacement HVAC controller as well as a selection of two or more wiring terminal labels indicative of the current wiring configuration of the current HVAC controller, the controller determine a new wiring configuration for the selected replacement HVAC controller based, at least in part, on the selected two or more wiring terminal labels and the selected replacement HVAC controller.

In another illustrative embodiment, a method of identifying a new wiring configuration for a replacement HVAC controller based on a current wiring configuration of a current HVAC controller includes: receiving a number of user inputs from a user via a user interface, the number of user inputs identifying a current wiring configuration of a current HVAC controller; and a replacement HVAC controller that is to replace the current HVAC controller; determining a new wiring configuration for the replacement HVAC controller based, at least in part, on the current wiring configuration of the current HVAC controller as well as the replacement HVAC controller that is to replace the current HVAC controller; and outputting the new wiring configuration for the replacement HVAC controller to the user interface.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments in connection with the accompanying drawings, in which:

FIGS. 2A-2D are several schematic drawings illustrating removal of an existing HVAC controller;

FIGS. 6-12 show several views of illustrative screens that may be displayed to a user.

Figure 1:
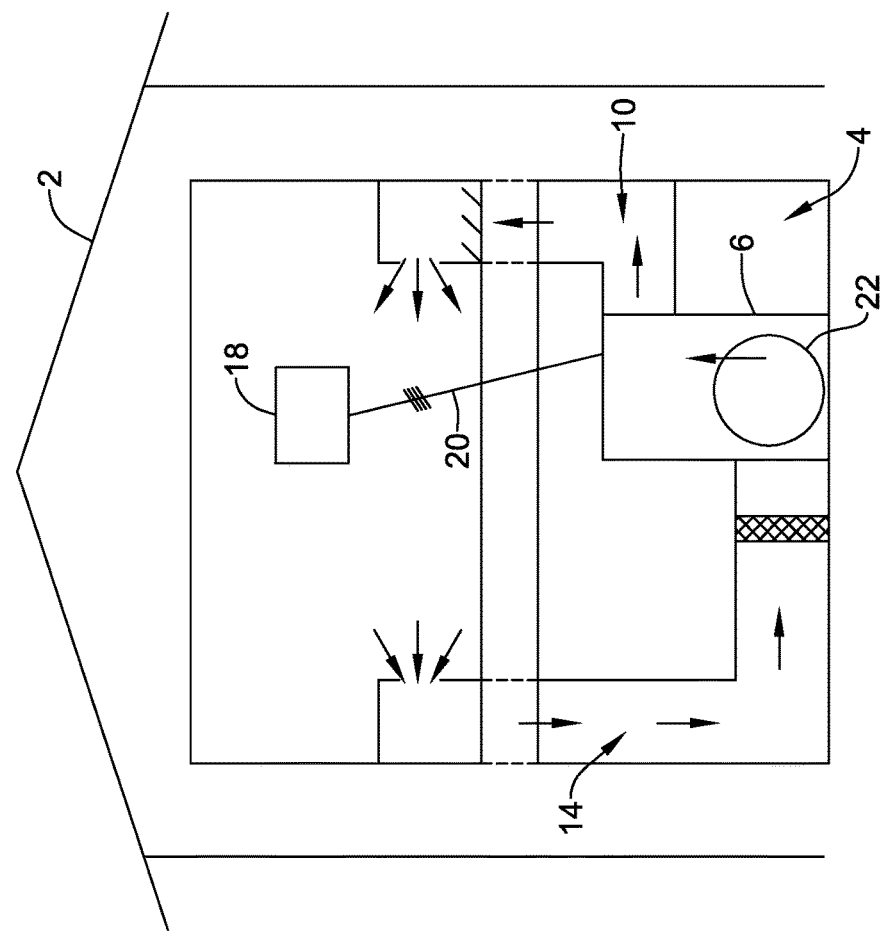
FIG. 1 is a schematic view of an illustrative HVAC system servicing a building or structure.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several embodiments which are meant to illustrative in nature.

FIG. 1 is a schematic view of a building 2 having an illustrative heating, ventilation, and air conditioning (HVAC) system 4. While FIG. 1 shows a typical forced air type HVAC system, other types of HVAC systems are contemplated including, but not limited to, boiler systems, radiant heating systems, electric heating systems, cooling systems, heat pump systems, and/or any other suitable type of HVAC system, as desired. The illustrative HVAC system 4 of FIG. 1 includes one or more HVAC components 6, a system of ductwork and air vents including a supply air duct 10 and a return air duct 14, and one or more HVAC controllers 18. The one or more HVAC components 6 may include, but are not limited to, a furnace, a heat pump, an electric heat pump, a geothermal heat pump, an electric heating unit, a backup heating unit, an air conditioning unit, a humidifier, a dehumidifier, an air exchanger, an air cleaner, a damper, a valve, and/or the like.

It is contemplated that the HVAC controller(s) 18 may be configured to control the comfort level in the building or structure by activating and deactivating the HVAC component(s) 6 in a controlled manner. The HVAC controller(s) 18 may be configured to control the HVAC component(s) 6 via a wired or wireless communication link 20. In some cases, the HVAC controller(s) 18 may be a thermostat, such as, for example, a wall mountable thermostat, but this is not required in all embodiments. Such a thermostat may include (e.g. within the thermostat housing) or have access to a temperature sensor for sensing an ambient temperature at or near the thermostat. In some instances, the HVAC controller(s) 18 may be a zone controller, or may include multiple zone controllers each monitoring and/or controlling the comfort level within a particular zone in the building or other structure. In some cases, the HVAC controller(s) 18 may be configured to communicate with one or more remote devices including a remote server and/or a user's mobile wireless device over a network.

In the illustrative HVAC system 4 shown in FIG. 1, the HVAC component(s) 6 may provide heated air (and/or cooled air) via the ductwork throughout the building 2. As illustrated, the HVAC component(s) 6 may be in fluid communication with every room and/or zone in the building 2 via the ductwork 10 and 14, but this is not required. In operation, when a heat call signal is provided by the HVAC controller(s) 18, an HVAC component 6 (e.g. forced warm air furnace) may be activated to supply heated air to one or more rooms and/or zones within the building 2 via supply air ducts 10. The heated air may be forced through supply air duct 10 by a blower or fan 22. In this example, the cooler air from each zone may be returned to the HVAC component 6 (e.g. forced warm air furnace) for heating via return air ducts 14. Similarly, when a cool call signal is provided by the HVAC controller(s) 18, an HVAC component 6 (e.g. air conditioning unit) may be activated to supply cooled air to one or more rooms and/or zones within the building or other structure via supply air ducts 10. The cooled air may be forced through supply air duct 10 by the blower or fan 22. In this example, the warmer air from each zone may be returned to the HVAC component 6 (e.g. air conditioning unit) for cooling via return air ducts 14.

In some cases, a user may desire to replace their existing HVAC controller 18 with a replacement HVAC controller 18. FIGS. 2A-2D show example steps that a user may follow when removing their existing HVAC controller 18. It will be generally understood that different HVAC controllers may involve different steps to effect their removal and/or replacement. Also, not every step is required and/or more steps may be added, depending on the circumstances.

Figure 2A:
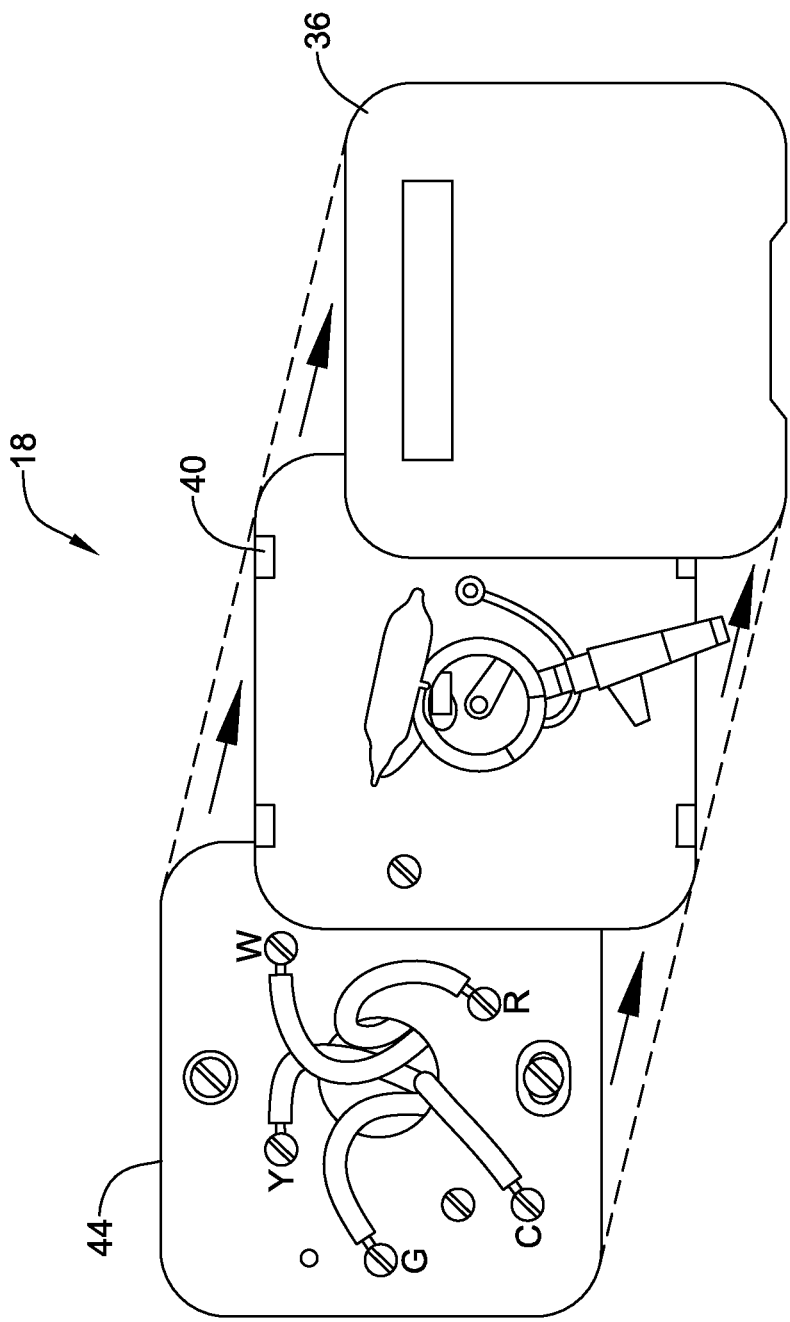
Figure 2B:
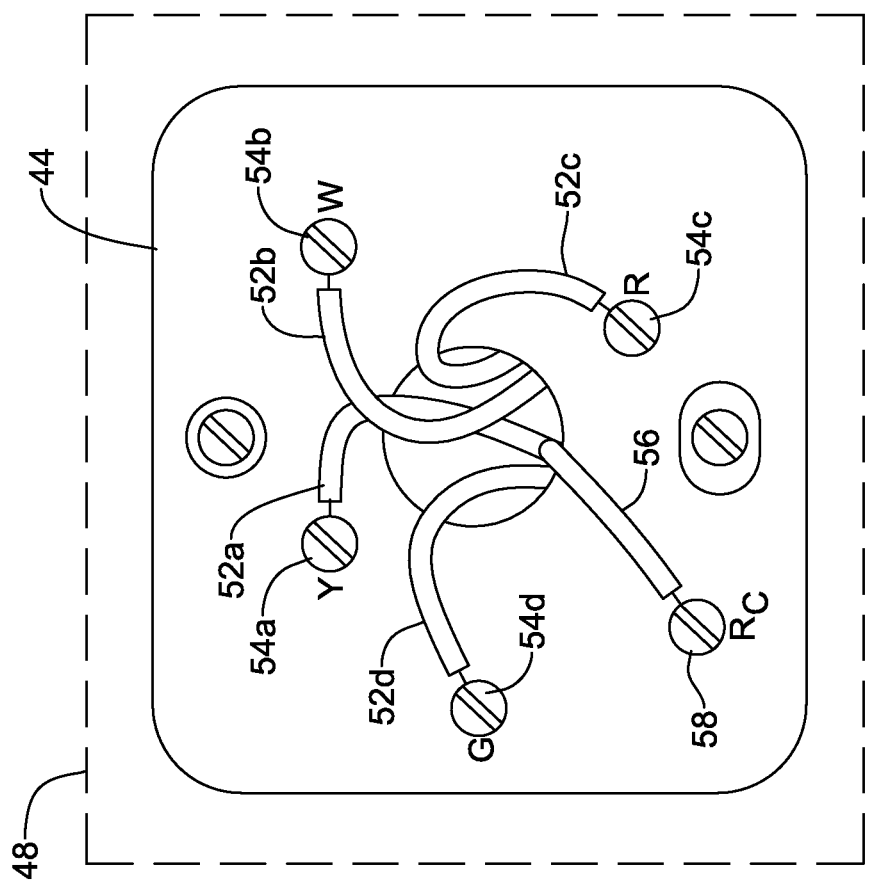

In the example shown in FIG. 2A, a user may first remove the housing cover 36 from the HVAC controller 18 and then, remove the HVAC controller housing 40 to expose the wall plate 44 attached to the wall of the building or structure in which the HVAC controller 18 is located. FIG. 2B shows the wall plate 44 mounted to the wall 48 of the building. As shown in FIG. 2B, a plurality of wires 52a-52d extends out of the wall 48 and through an opening provided in the wall plate 44. The one or more wires 52a-52d extend from and are in electrical communication with the one or more components 6 of the HVAC system 4 servicing the building. Each wire 52a-52d may be connected to an appropriate wire terminal 54a-54d on the wall plate, often in a one-to-one manner, such that they are capable of carrying signals from the HVAC controller 18 to the appropriate HVAC component 6. In some cases, the wires 52a-52 may provide one-way or bi-directional communication between the HVAC controller 18 and the HVAC system 4. The number of wires available for connection to the HVAC controller 18 may be dependent on the number and type of HVAC components 6 incorporated into the HVAC system 4 and/or the previous HVAC controller.

As shown in FIG. 2B, each of the wire terminals 54a-54d may be labeled with a standard wire terminal label as will be generally recognized by those of skill in the art. In this example, wires terminals 54a-54d are labeled Y (e.g. cooling), W (e.g. heat), R (24 VAC power to be switched), and G (e.g. fan), respectively. These wires may be color coded, such that the Y wire is Yellow, the W wire is White, the R wire is Read and the G wire is Green.

Figure 2C:
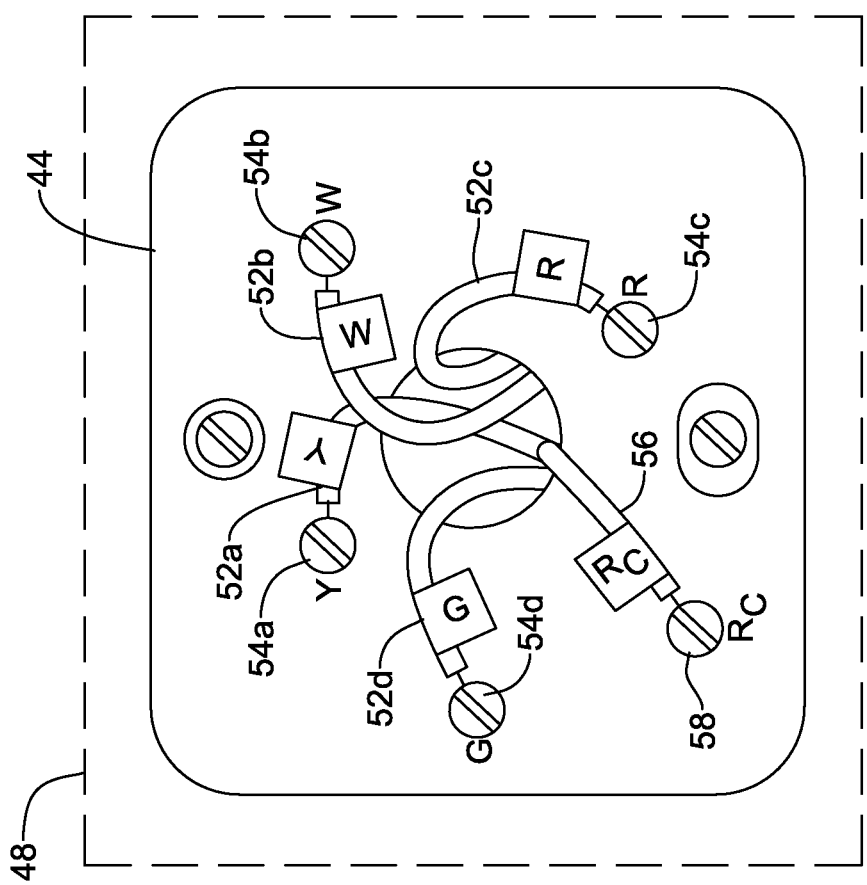

In some cases, as shown in FIG. 2B, an additional wire 56 may be connected to an additional wire terminal 58 labeled Rc (e.g. 24 VAC Cooling call switch power). In some cases, before removing the wires and/or wall plate 44, the user may take a picture or video of the existing wiring configuration, label the wires 52a-52d with the wire terminal labels as shown in FIG. 2C, or otherwise note the existing wiring configuration for the existing HVAC controller 18 that is being replaced by the replacement HVAC controller 18. Labeling the wires with the wire terminal designations and/or taking a picture or video of the existing wiring configuration may facilitate identification of an appropriate wiring configuration for the replacement HVAC controller 18, as further described herein. FIG. 2D is a schematic view of the wires 52a-52c and 56 after removal of the wall plate from the wall. As shown in FIG. 2D, the wires 52a-52c and 56 have been labeled with the appropriate wire terminal label 54a-54c and 58, respectively.

Figure 3:
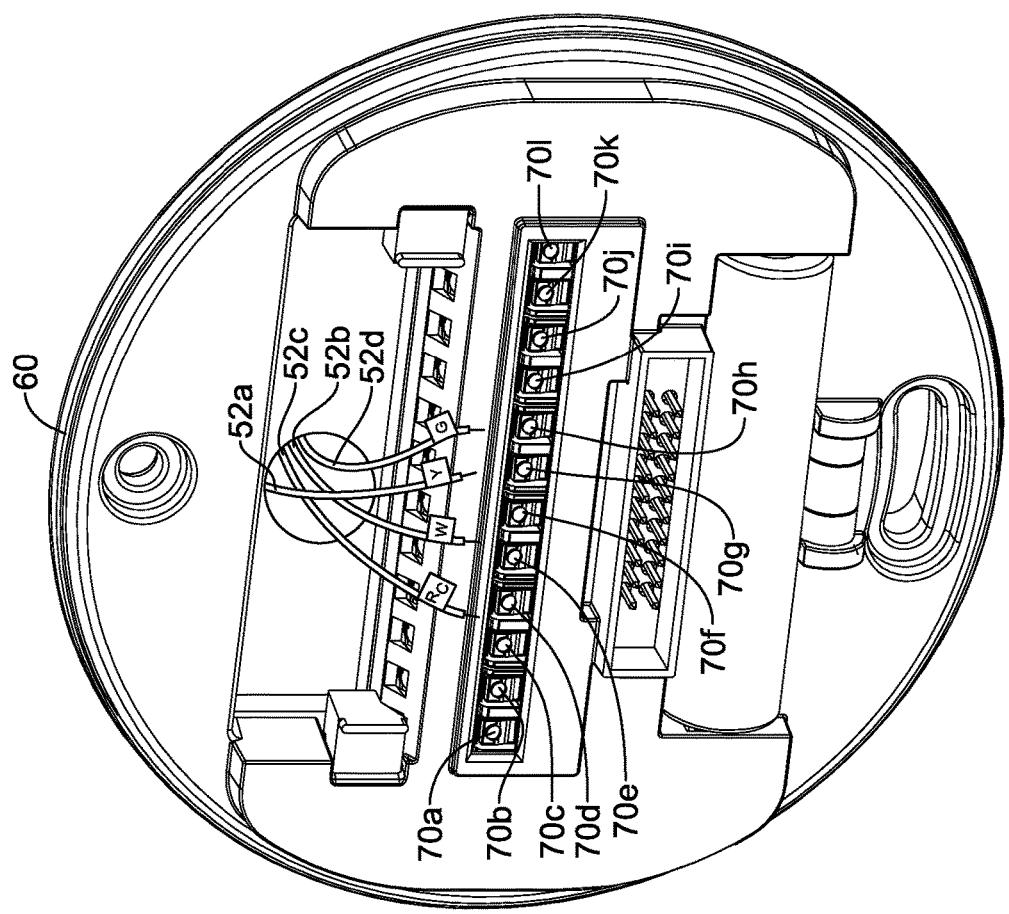
FIG. 3 is schematic view of a wall plate of a replacement HVAC controller mounted on a wall, with the wires of the HVAC system ready to be wired in accordance with a new wiring configuration.

Next, as shown in FIG. 3, the user may place a wall plate 60 of the replacement HVAC controller 18 over the wires 52a-52d extending out of the wall 48 such that they may be connected to one or more wire terminals 70a-70l provided on the new wall plate 60. The wire terminals 70a-70l may be labeled (not shown) with wire terminal labels generally known to those skill in the art, but this is not required. An exemplary, non-limiting list of commonly used wire terminal labels and their corresponding description is provided below in Table 1 below. The wiring terminal labels listed in Table 1 are just some examples. In some cases, different manufacturers may utilize different wiring terminal designations for different equipment types.

TABLE 1

| Terminal Code | Description |
| --- | --- |
| 1 | Special communication terminal |
| 2 | Special communication terminal |
| 3 | Special communication terminal |
| 4 | Special communication terminal or 24 Vac Power or heat on power-open/power close hot water valves (W) |
| 5 | Power on power-open/power close hot water valves (R) |
| 6 | End call for heat on power-open/power close hot water valves (Y) |
| AUX | Back up heat for heat pump |
| B | Heat pump reversing valve in heat or 24 Vac common wire |
| C | 24 volt neutral (also referred to as the common wire) |
| Dehum | Dehumidification |
| E | Emergency heat relay on a heat pump |
| F | Fan |
| G | Fan |
| Hum | Humidifier |
| L | Heat pump monitor |
| L1 | Line Power - 120/240 volts |

TABLE 1-continued

| Terminal Code | Description |
| --- | --- |
| L2 | Line Power - 120/240 volts |
| M | Compressor - first stage cooling |
| O | Heat Pump Reversing valve in cooling |
| R | 24 VAC power to be switched |
| Rc | 24 VAC cooling call switch power |
| Rh | 24 VAC heat call switch power |
| S1 | Sensor terminal |
| S2 | Sensor terminal |
| T1 | Sensor terminal |
| T2 | Sensor terminal |
| V | 24 VAC power to be switched |
| Vent | Ventilation equipment |
| W | First stage heating |
| W1 | First stage heat or auxiliary heat |
| W2 | Second stage heat or auxiliary heat |
| W3 | Third stage heat or auxiliary heat |
| X | Emergency Heat or 24 Vac Common |
| X2 | Emergency heat or indicator lights on some thermostats |
| Y | First stage cooling/compressor |
| Y1 | First stage cooling/compressor |

The number and/or type of wire terminals available for connection may be dependent upon the make and/or model of the replacement HVAC controller 18 and the number and/or type of HVAC components 6 that the replacement HVAC controller 18 is intended to control. As previously noted, there may be multiple thermostat wiring configuration options for different HVAC system types which may present a challenge to the user when installing a replacement HVAC controller 18.

Figure 4:
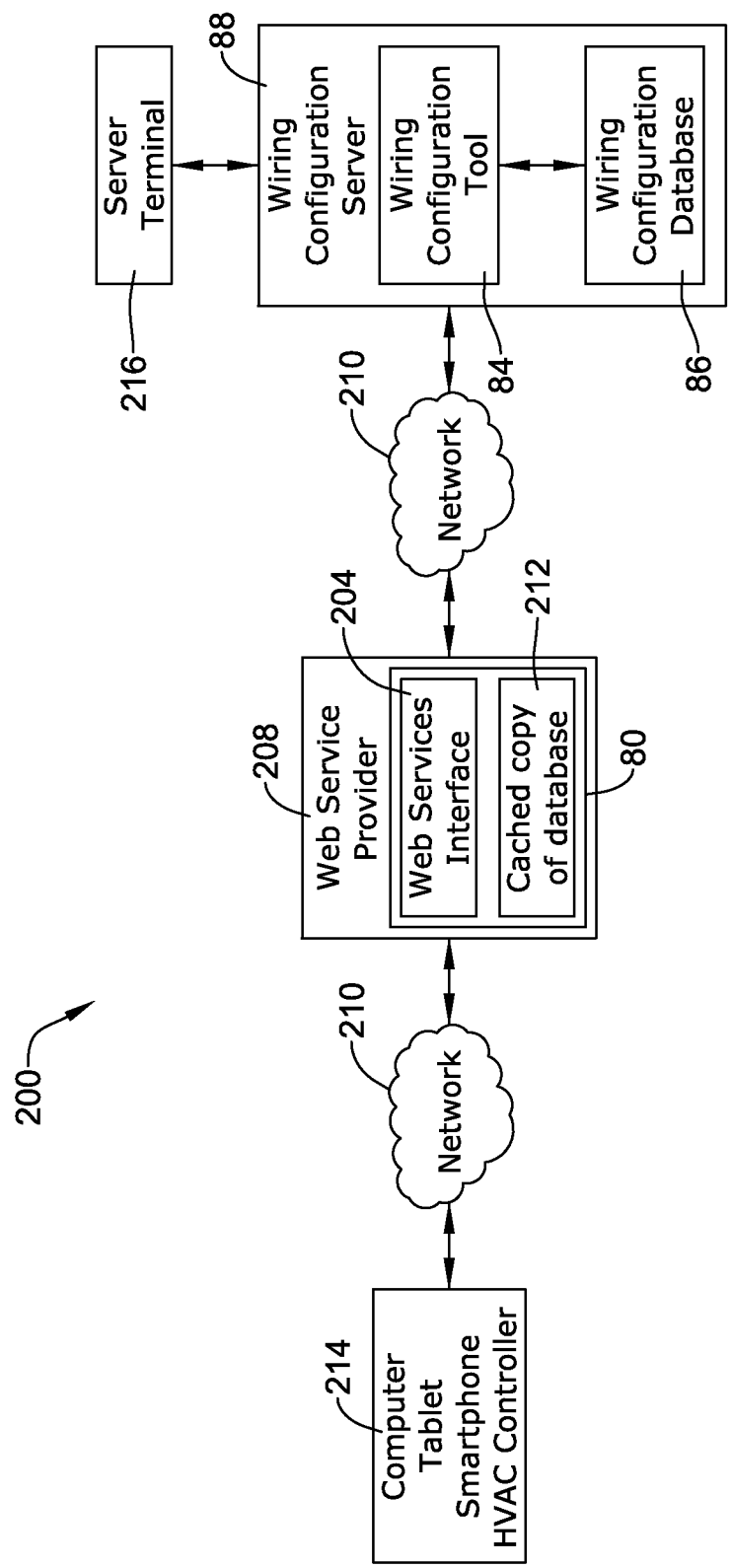
FIG. 4 is a schematic view of a system for facilitating identification of the new wiring configuration for the replacement HVAC controller of FIG. 3.

FIG. 4 is a schematic view of a system 200 that may be utilized by a user to facilitate identification of an appropriate wiring configuration for the user's replacement HVAC controller 18. The user may desire to use the system 200 when they are unsure as to how the replacement HVAC controller 18 should be wired to control the exiting HVAC system 4. In some cases, the user may initiate a session with a customer service to assist with the identification of an appropriate wiring configuration for the selected replacement HVAC controller 18. The customer service may be provided by the manufacturer of the replacement HVAC controller 18 to provide technical and/or customer service support to customers installing the manufacturer's products. In some cases, the user may contact customer service over the telephone or via a web services interface 204 hosted by a web service provider 208 such as, for example, Honeywell's TOTAL CONNECT™ web service. In some cases, the web service provider 208 may be in communication with a customer service server 80 over a network 210. In some cases, the web service provider 208 may host a cached copy 212 of a wiring configuration database 86 that may be maintained by the customer service server 80, and that may be utilized to identify a new wiring configuration for the replacement HVAC controller 18.

In some instances, the user may initiate a request for help through the web service provider 208 using a web enabled device 214 such as a personal computer, laptop computer, tablet computer, a smart phone, the replacement HVAC controller and/or the like capable of viewing one or more web pages served up by the web service provide 208 via a web services interface 204. In some cases, the device 214, such as a personal computer, laptop computer, tablet computer, a smart phone, the replacement HVAC controller and/or the like, may download an application (or app), which may communicate with the web service provider 208 and display information to the user.

The one or more web pages served up by the web services interface 204 (or downloaded app) may provide a user interface through which the user may interact with the customer service server 80. In other cases, the user may initiate a request for help through an application program (app) stored in the memory of their tablet computer, smart phone or other device. In some cases, the application program (app) may be available for downloading from the web services provider 208. Similar to the web services interface 204, the application program (app) may cause the user's device to display one or more screens through which the user may interact with customer service. In other cases, the user may contact customer service directly such as, for example, using a telephone by calling a customer service or technical support phone number, initiating a live chat session with customer service through a customer service web site, via email, and/or in any other suitable manner. In some cases, a customer service agent may access the server 80 using a server terminal 216 or through a web portal that is in communication with the server 80.

Figure 5:
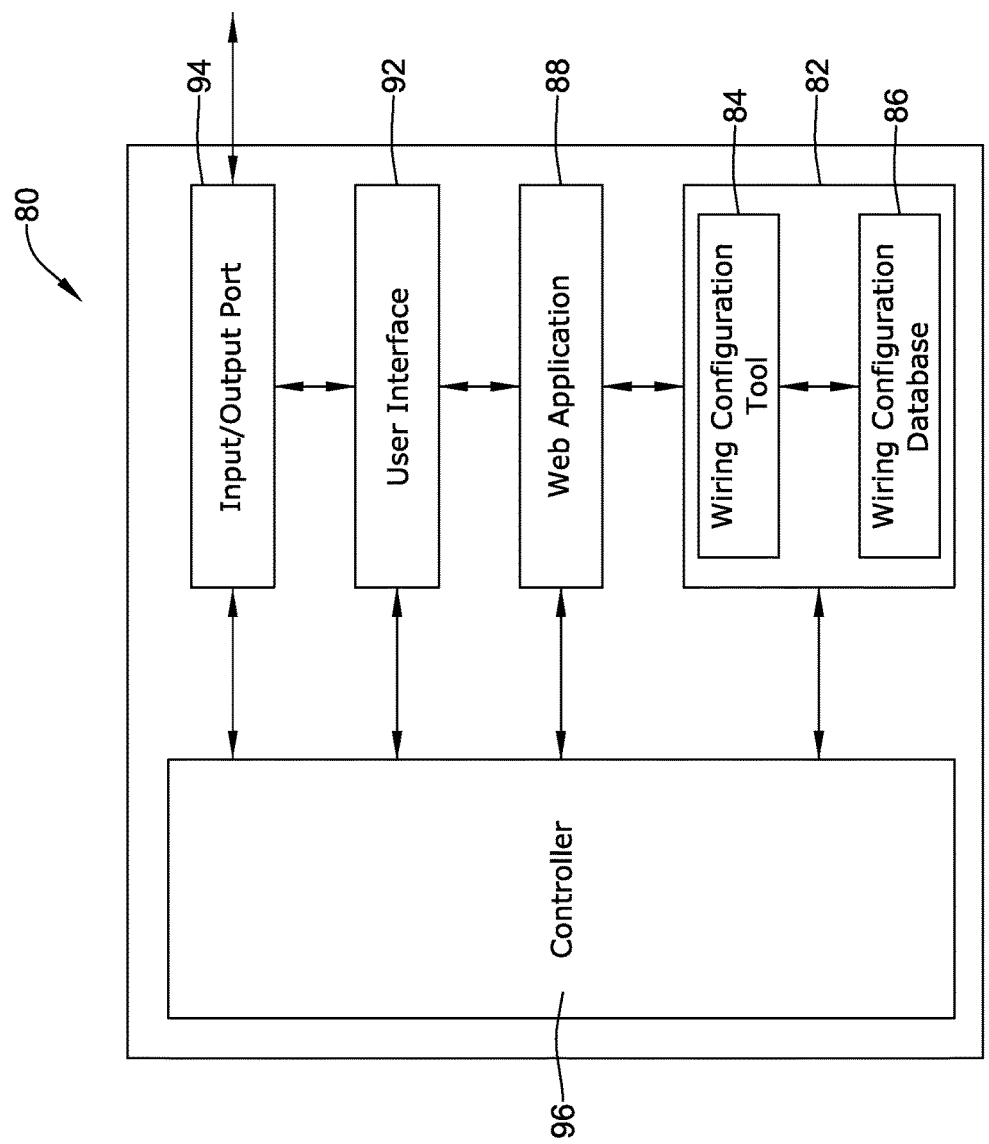
FIG. 5 is a schematic block diagram of an illustrative server that may host the Web Service 208 of FIG. 4.

FIG. 5 is a schematic block diagram of an illustrative server 80, as discussed herein with reference to FIG. 4, to facilitate identification of a wiring configuration for a replacement HVAC controller 18. As shown in FIG. 5, the server 80 may include a memory 82 storing a wiring configuration tool 84 and a wiring configuration database 86. In addition, the server 80 may include a web application 88 for serving up one or more screens or web pages via a user interface 92. In some cases, the user interface 92 may be provided by a computer or server terminal that is connected to the server 80, and may be any suitable user interface 92 that is capable of receiving one or more interactions from the customer service agent or other user. In other cases, the user interface 92 may be provided at a remote device that is in communication with the server 80 over a network via the input/output port 94. Such a remote user interface 92 maybe provided by a web services interface 204 or by an application program (app) executed by a user's smart phone, tablet computer and/or any other suitable device, as discussed herein. A controller 96 may be operatively coupled to and in communication with each of the memory 82, the web application 88, the user interface 92, and the input/output port 94, and may be programmed to execute the tools and/or application programs stored in the memory 82. In some cases, the controller 96 may be programmed to execute the wiring configuration tool 84 in response to receiving a request from the user via the user interface 92. The wiring configuration tool 84 may be programmed to identify a new wiring configuration for a replacement HVAC controller based, at least in part, on information provided by the user regarding the wiring configuration of the existing HVAC controller 18 that is being replaced by the replacement HVAC controller. The wiring configuration tool 84 may be programmed to provide the new wiring configuration to a user via the user interface 92.

In some cases, the customer requesting help in identifying a new wiring configuration for a replacement HVAC controller may be associated with a customer service account or user profile stored in the memory 82 of the server 80. As discussed herein, the customer requesting help may initiate the request for help via an app stored on the user's smart phone or tablet computer, via a web services interface provided by a web service provided that is in communication with the server 80 or by contacting customer service in any other suitable way. As such, through the customer's customer service account or user profile, the customer service agent may have access to information about the user's HVAC system, the user's existing HVAC controller, the user's preferred HVAC system settings, and/or the like. In addition, information stored in the memory 82 the server 80 that is associated with the user's account or user's profile may be used to auto populate one or more fields associated with the wiring configuration tool 84 as will be described in greater detail below. However, this is not required.

The wiring configuration tool 84 may be launched in response to receiving the request for help from the customer. As discussed herein, the user may initiate a request for help through a web services interface 204 hosted by a web service provider 208 using a web enabled device 214, through an application program (app) stored in the memory of their tablet computer or smart phone, or in any other suitable manner. In some cases, the user may contact customer service directly such as, for example, using a telephone by calling a customer service or technical support phone number or by initiating a live chat session with customer service through a customer service web site. In this example, a customer service representative may launch the wiring configuration tool by entering the appropriate command at a server terminal 216 connected to the server 80. The wiring configuration tool 84 may cause the controller 96 to display one or more screens to a user via the user interface 92 that may guide the user through identification of an appropriate wiring configuration for the replacement HVAC controller 18. As discussed herein, such a user interface 92 may be provided by a web services interface 204, by an application program (app) executed by a user's smart phone or tablet computer, on the replacement HVAC controller, or in any other suitable manner. In other cases, the remote user interface 92 may be provided at a server terminal 216 connected to the server 80 that may be accessed by a customer service agent working with the user via telephone or live chat session initiated though a customer service web site.

FIGS. 6-12 provide several illustrative views of an exemplary screen 100 that may be displayed to a user via a user interface 92 in connection with the wiring configuration tool 84. While FIGS. 6-12 are generally described in the context of the example in which a user has contacted a customer service agent via telephone, and the customer service agent is interacting with the wiring configuration tool 84 via a user interface 92 provided at a server terminal 216 or other suitable user interface, it will be generally understood that the same or similar screens may be displayed to a user via a user interface 92 provided via a web service hosted by a web service provider that is connected to the server 80 over a network, provided by an application program (app) executed by a user's smart phone, provided by a replacement HVAC controller, and/or by any other suitable device.

Figure 6:
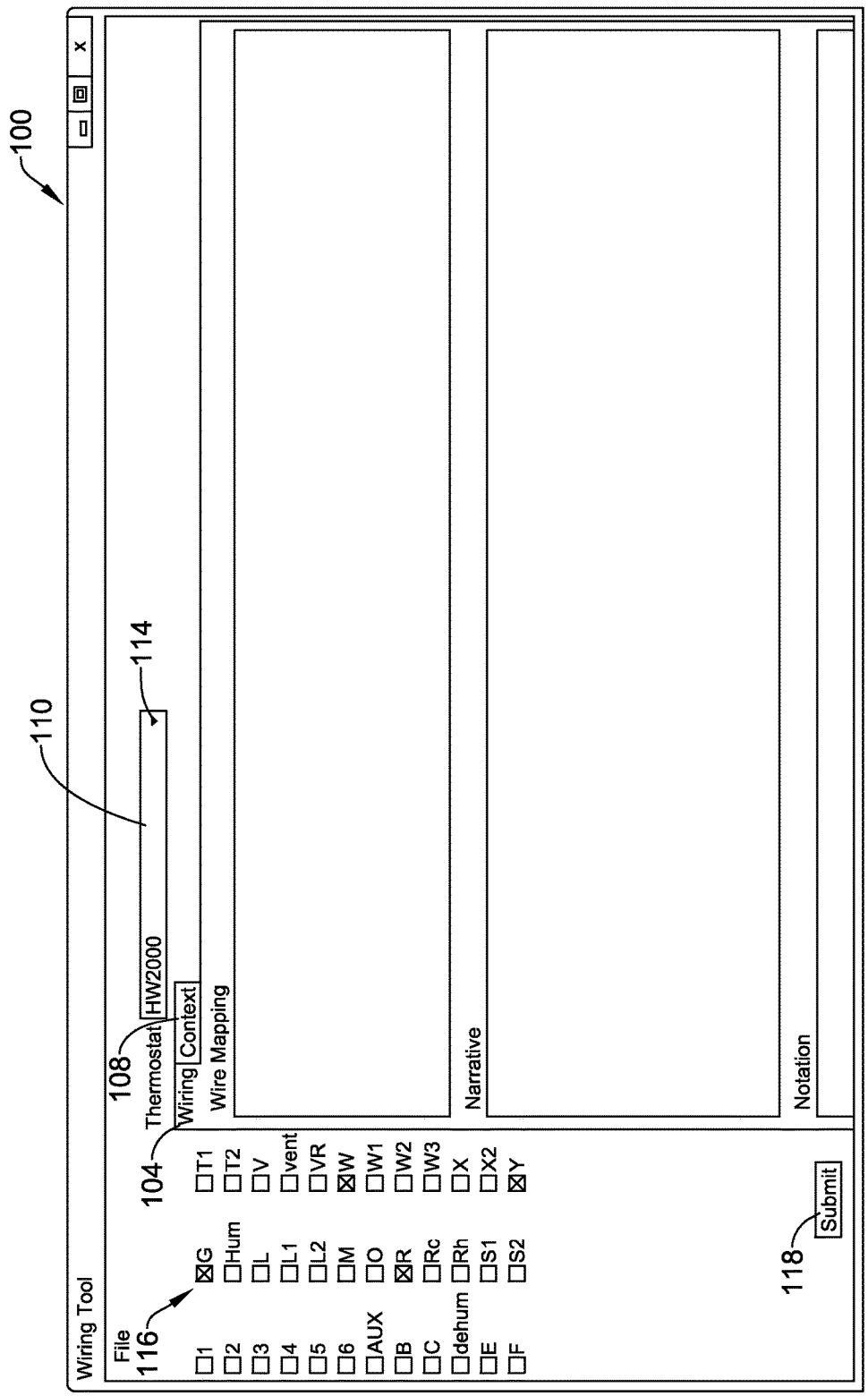
Figure 7:
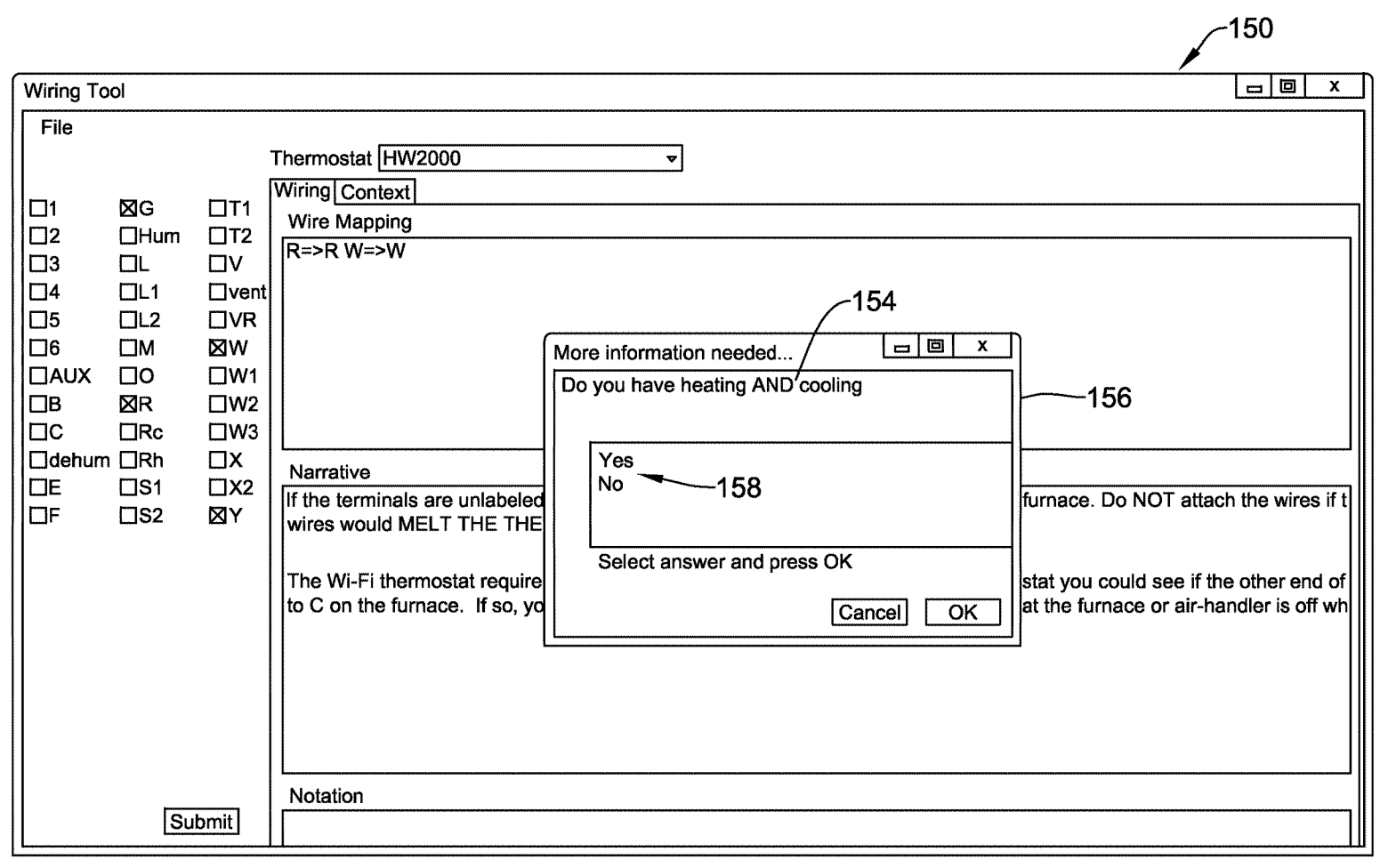
Figure 8:
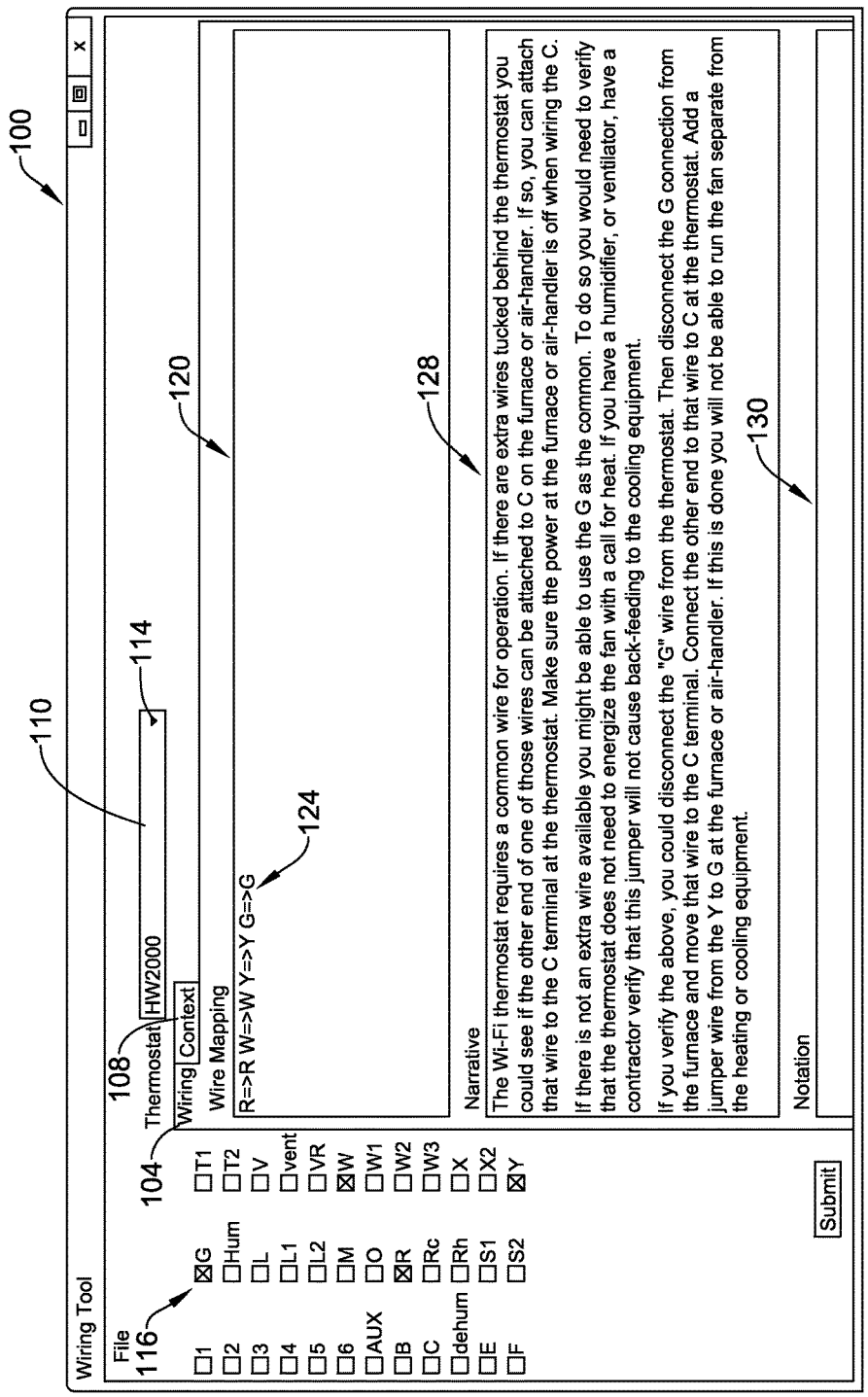
Figure 9:
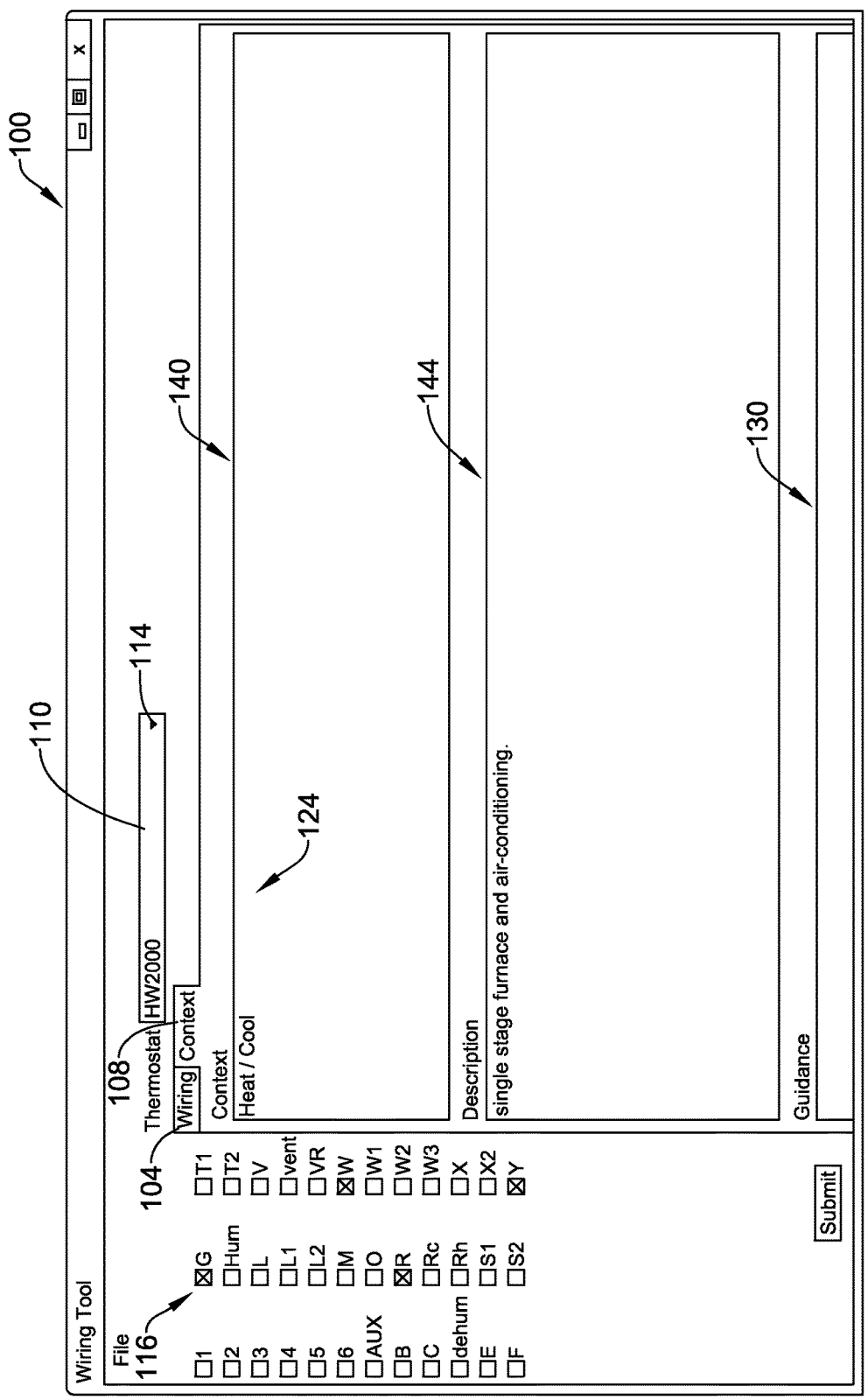

In some cases, as shown in FIGS. 6-12, an illustrative screen 100 may include a first tab 104 that, when selected by the user, may cause the controller 96 to display information related to a wiring configuration as shown in FIGS. 6 and 8. In addition, screen 100 may include a second tab 108 that, when selected by the user, may cause the controller 96 to display contextual information related to the HVAC system 4, as shown in FIG. 9. While FIG. 6-12 are described as they relate to the different information that may be displayed on a single screen of a user interface 92 based on one or more inputs received from a user, it will be generally understood the any of the information displayed in the various views of screen 100 may be displayed using two or more separate screens or sequence of two or more screens, as desired.

Referring now to FIGS. 6-12, a user (e.g. customer service agent—or customer) may enter or select the appropriate manufacturer and model of the replacement HVAC controller 18 indicated by the customer in the appropriate field provided by screen 100. As shown in FIGS. 6-12, the user may select the appropriate replacement HVAC controller (e.g. HW2000) from a list 110 of two or more possible replacement HVAC controllers available for selection. In some cases, the list 110 of replacement HVAC controllers available for selection may be accessed by the customer service agent (or customer) via a drop-down box 114 as shown in FIGS. 6-12. This is just one example. In some cases, the user may enter information about their previous HVAC controller, such as manufacturer and model.

Next, the customer service agent may query the customer about the current wiring configuration of the existing HVAC controller that is to be replaced by the replacement HVAC controller 18. In some cases, the customer may respond to the query from the customer service agent by uploading a picture or video of the existing wiring configuration via an appropriate user interface provided by a customer service website or by an application program executed by the user's smart phone or tablet for that purpose. In this example, the controller 96 may be configured to automatically identify the current wiring configuration based, at least in part, on the picture or video uploaded to the server 80 by the user, sometimes with image processing. In other cases, the customer may verbally relay the information to the customer service agent. Regardless of how the information regarding the current wiring configuration of the existing HVAC controller is conveyed to the customer service agent, the customer service agent may input the current wiring configuration associated with the existing HVAC controller using screen 100 by selecting the appropriate wiring terminal labels 116 associated with the current wiring configuration of the existing HVAC controller as indicated by the customer. The customer service agent may select the appropriate wiring terminal labels from a plurality of wire terminal labels 116 that are commonly associated with HVAC controllers and are generally known to those of skill in the art. In some cases, as shown, the plurality of wire terminal labels 116 for selection may be displayed as a list including check boxes or radio buttons for indicating selection. For example, as shown in FIG. 6, wire terminal labels, G, R, W, and Y have been selected. This is just one example. The customer service agent may then select the SUBMIT button 118 or other similar button to submit selection of the replacement HVAC controller from the list 110 of possible replacement HVAC controllers and the wire terminal labels 116 G, R, W, and W associated with the existing wiring configuration.

In many cases, the controller 96 may be configured to determine a new wiring configuration for the replacement HVAC controller 18 based, at least in part, on the one or more inputs received from the customer service agent (or customer) indicative of the current wiring configuration of the existing HVAC controller and the make and model of the replacement HVAC controller 18 that is to replace the existing HVAC controller. The controller 96 may determine the new wiring configuration for the replacement HVAC controller by comparing the inputs received from the user indicative of the current wiring configuration of the current HVAC controller and the make and model of the replacement HVAC controller to information stored in a wiring configuration database 86 stored in the memory 82 of the server 80. In some cases, the database 86 may include one or more look-up tables including a plurality of legacy wiring configurations to new wiring configurations groups for a number of possible replacement HVAC controllers. The controller 96 may utilize the replacement HVAC controller information to first isolate the appropriate lookup table of legacy wiring configurations to new wiring configurations groups, and then compare the existing wiring configuration to the information contained within the selected lookup table to identify a possible new wiring configuration for the replacement HVAC controller 18 indicated by the user via the user interface 92.

Depending upon the features of the HVAC system 4 to be controlled by the replacement HVAC controller, a legacy wiring configuration may correspond to more than one new wiring configuration. In some cases, the controller 96 may not be able to determine a single wiring configuration based on the current wiring configuration indicated by the user. As such, the controller 96 may be further programmed to cause the wiring configuration tool 84 to generate one or more user queries requesting additional information from the user via the user interface 92. The one or more user queries may be based, at least in part, on the one or more inputs received from the user indicative of the current or historical wiring configuration. The one or more queries for additional information may relate to the characteristic(s) of the HVAC system 4 that is to be controlled by the replacement HVAC controller 18. For example, the one or more user queries may query the user as to whether or not the HVAC system 4 includes both heating and cooling. In other cases, the one or more user queries may query the user about the heating and/or cooling equipment type, the number of cooling and/or heating equipment stages, whether the heating system is gas or electric, whether or not the system includes backup heat, and/or the like. These are just some examples.

FIG. 7 shows an example of a screen 150 that includes a request for additional information from the user about features of the HVAC system 4 to be controlled by the replacement HVAC controller 18. In some cases, as shown in FIG. 7, the user query 154 for additional information about one or more characteristics of the HVAC system 4 may be displayed in a pop-up or floating window 156 that may displayed over the wiring configuration information entered by the user via screen 100. In other cases, the user query 154 may be displayed in a separate window or screen. The user query 154 may include one or more selectable options 158 though which a user may respond to the user query 154. The controller 96 may be programmed to utilize the user's response(s) to the user query(s) for additional information to resolve the new wiring configuration to a single wiring configuration.

Upon determining a new wiring configuration, the controller 96 may be programmed to output a new wiring configuration for the replacement HVAC controller 18. In some cases, the controller 96 may be configured to cause the wiring configuration tool 84 to visually display the new wiring configuration to the user via the user interface 92. In other cases, the controller 96 may be configured to transmit the new wiring configuration information to the customer via SMS text message or email message using a cellular phone number and/or email message associated with the user's customer service account or user profile. Any other suitable mechanism may be used to communicate the new wiring configuration to the user.

FIG. 8 shows an exemplary view of screen 100 including the new wiring configuration for the replacement HVAC controller. The new wiring configuration may be visually displayed to the user in a first region 120 of screen 100. In some cases, as shown in FIG. 8, the controller 96 may be configured to display a wire map 124 showing the wire mapping between the existing wiring configuration as indicated by the user through wiring configuration tool 84, and the new wiring configuration determined by the controller 96. The wiring map 124 may indicate which wires from the HVAC system 4 should be connected to which wire terminals on the replacement HVAC controller 18. For example, as shown in region 120 of screen 100 of FIG. 8, the wire mapping from the existing HVAC controller to the new replacement HVAC controller is indicated as follows: R→R, W→W, Y→Y, G→G. In other words, the wire previously connected to the R terminal on the previous HVAC controller should be connected to the R terminal on the replacement HVAC controller 18; the wire connected to the W terminal on the previous HVAC controller should be connected to the W terminal on the replacement HVAC controller 18; the wire connected to the Y terminal on the previous HVAC controller should be connected to the Y terminal on the replacement HVAC controller 18; and the wire connected to the G terminal on the previous HVAC controller should be connected to the G terminal on replacement HVAC controller 18. This is just one example. In another example, the wire mapping designations may be displayed in a table such as is shown below in Table 2.

TABLE 2

| Previous HVAC Controller | Replacement HVAC Controller |
|---|---|
| R | R jumped to Rc |
| Y | Y |
| W | Aux/E |
| G | G |
| Y2 | Y2 |
| B | C |
| O | O |
| X2 jumped to W | No jumper needed |
| F | L |

As can be seen from the wiring mapping information provided in Table 2, there may not always be a direct correspondence between the wiring terminals utilized on the previous HVAC controller and the wiring terminals of the replacement HVAC controller.

In some cases, in addition to the new wiring configuration displayed in a first region 120 of the screen 100, the controller 96 may be configured to display a narrative 128 related to the new wiring configuration. The narrative 128 may be displayed in a second region 130 of screen 100, and may contain additional information related to the new wiring configuration that may be useful to the customer when wiring the replacement HVAC controller following the new wiring configuration displayed in the first region 120. In some cases, the additional information contained within the narrative 128 may include further instructions for wiring the replacement HVAC controller 18 to control the existing HVAC system 4. In addition, or in the alternative, second region 130 may provide troubleshooting information that may assist the user in trouble shooting any difficulties that they may experience when wiring the replacement HVAC controller 18 following the new wiring configuration displayed in the first region 120. This troubleshooting information may be distilled from common problems experienced by previous users. In some cases, such common problems may be recorded by customer service agents as they assist customers. Solutions to the common problems may be developed, and may be added to the wiring configuration database 86 and displayed in second region 130.

In some cases, selection of second tab 108 may cause the controller 96 to display the user display contextual information about the wiring configuration displayed when tab 104 is selected. FIG. 9 shows an example of screen 100 in which the second tab 108 has been selected by a user. As shown in FIG. 9, tab 108 may display contextual information about the wiring configuration indicated via tab 104 in a first region 140. In addition, selection of second tab 108 may cause the controller to display contextual information related to the HVAC system in a second region 144 of screen 100.

Figure 10:
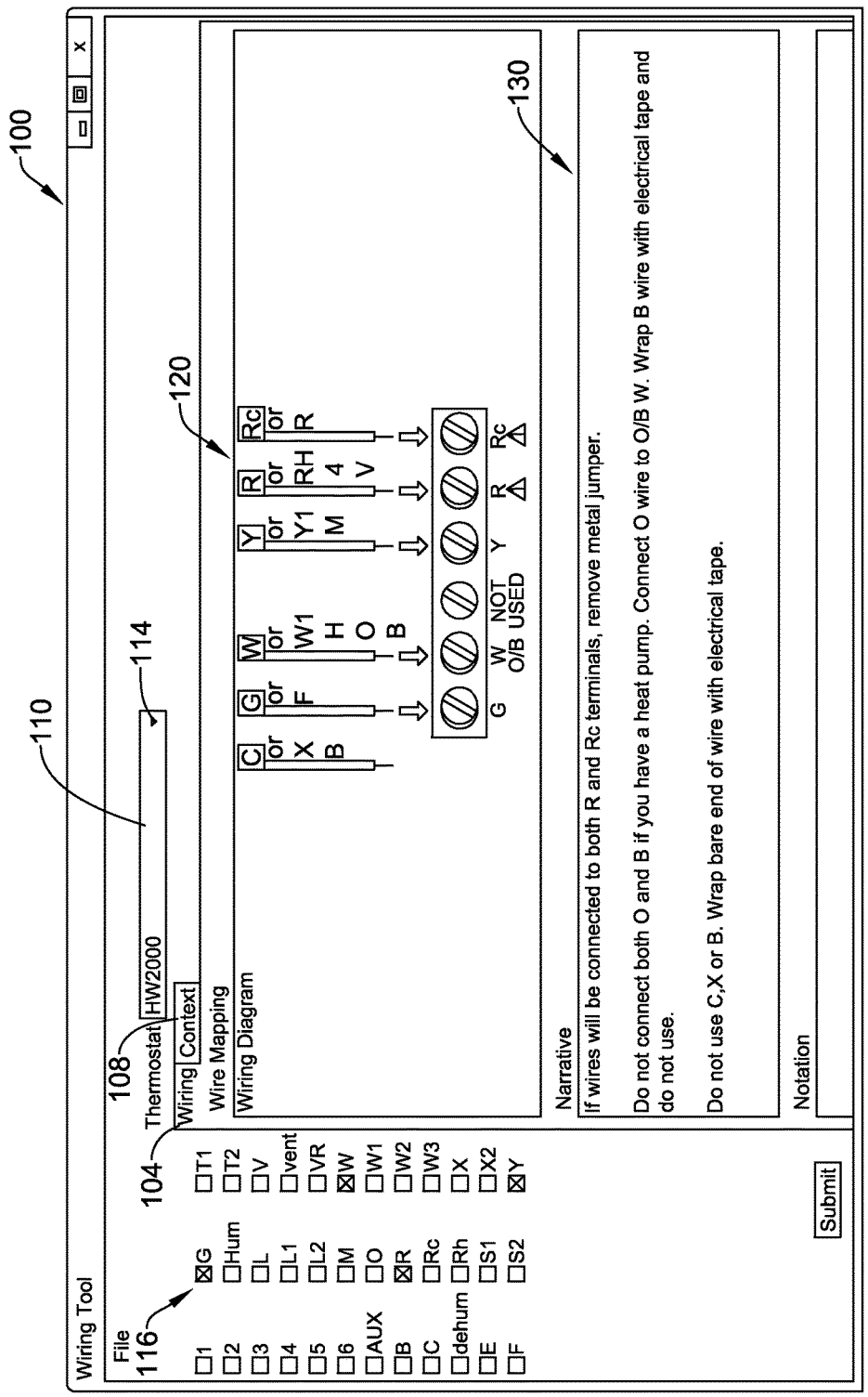

In some cases, the controller 96 may be configured to display a wiring diagram of the new wiring configuration. FIG. 10 is an exemplary view of screen 100 in which a wiring diagram 134 of the new wiring configuration is displayed in the first region 120. Similar to FIG. 8, a narrative 138 related to the wiring configuration diagram 134 showing a new wiring configuration for a replacement HVAC controller 18 may be displayed in the second region 130 of the screen 100. As discussed herein, the narrative 138 may contain additional information related to the new wiring configuration that may be useful to the customer when wiring the replacement HVAC controller 18 following the new wiring configuration displayed in the first region 120. In some cases, the additional information contained within the narrative 128 may include further instructions for wiring the replacement HVAC controller to control the existing HVAC system 4. In addition or in alternative to, the narrative 128 may provide troubleshooting information that may assist the user in trouble shooting any difficulties that they may experience when wiring the replacement HVAC controller following the new wiring configuration displayed in the first region 120. In many cases, the customer service may deliver all or some of the information displayed in the narrative 128 to the customer.

Figure 11:
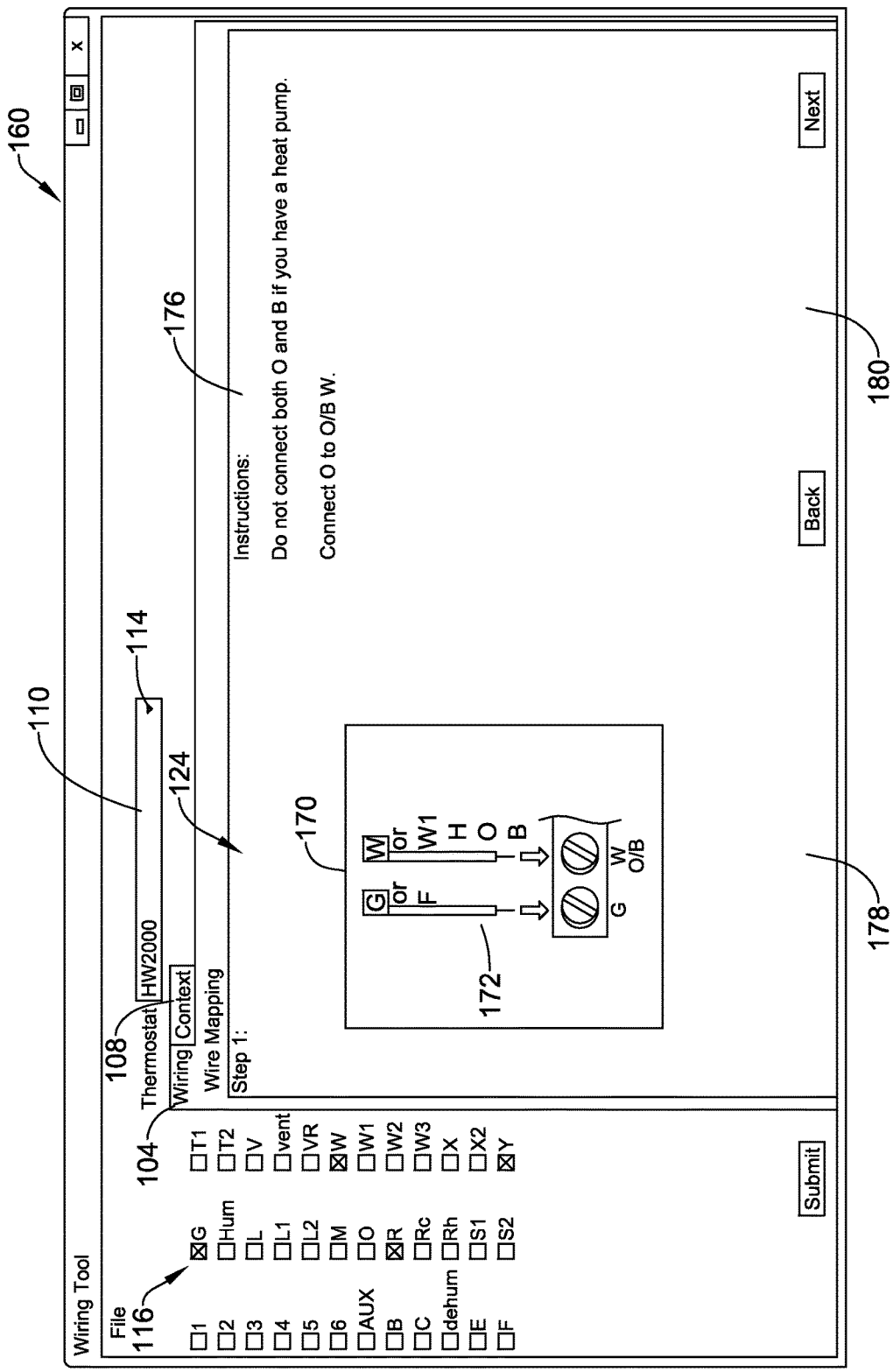
Figure 12:
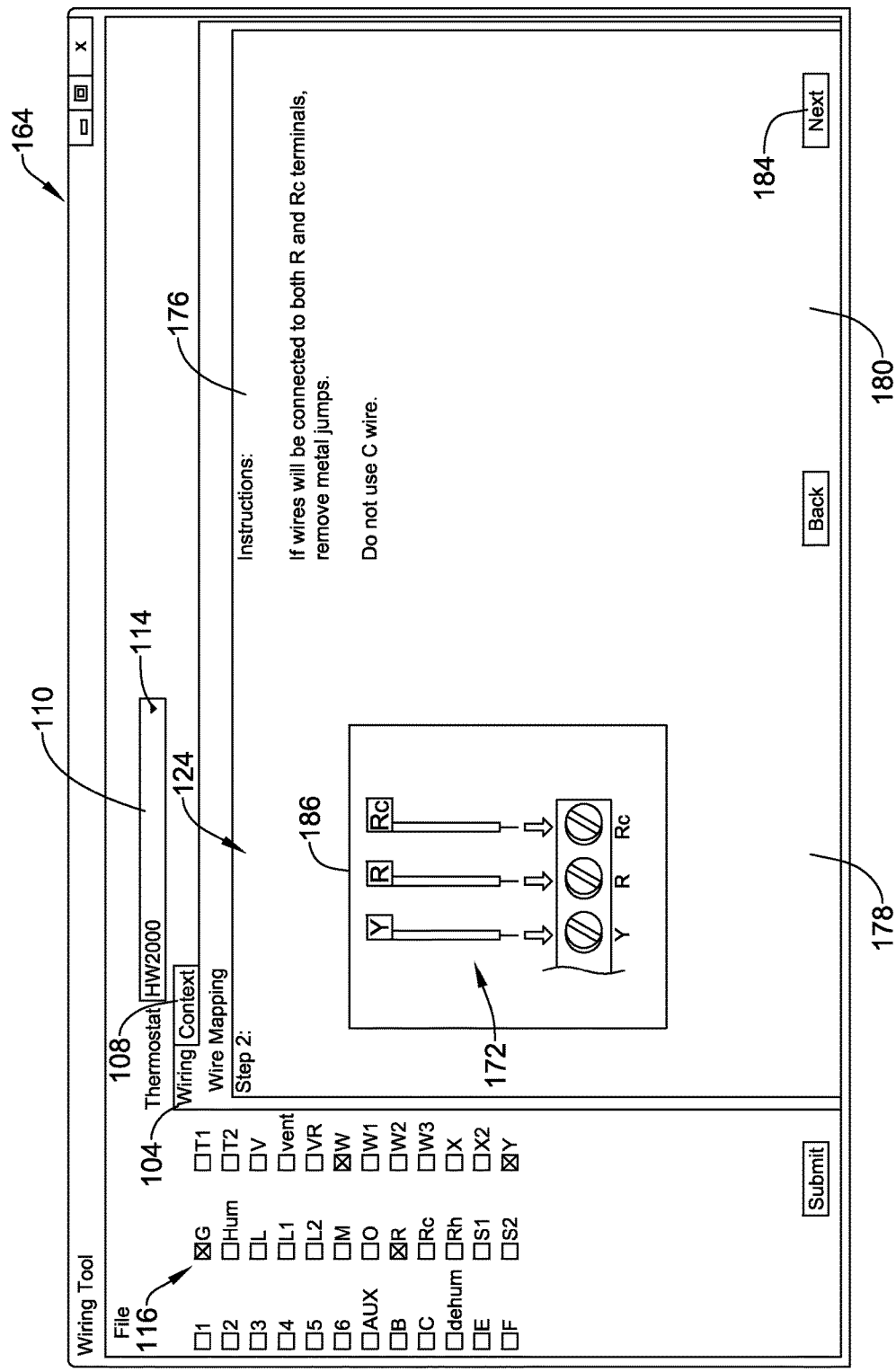

In other cases, as shown in FIGS. 11 and 12, the controller 96 may be configured to display a sequence of two or more screens 160, 164, each screen showing at least a portion of a new wiring configuration. In some cases, the sequence of two or more screens 160, 164 may be a predetermined sequence of screens having a pre-determined order. For example, as shown in FIG. 11, the controller 96 may be configured to display a first screen 160 including a first portion 170 of a wiring diagram 172. In addition, the controller 96 may be further configured to display at least one instructional step 176 for wiring the new HVAC controller according to the new wiring configuration. In some cases, the first portion 170 of the wiring diagram 172 may be displayed in a first region 178 of screen 160 and the at least one instruction step for wiring the replacement HVAC controller associated with the first portion 170 the wiring diagram 172 may be displayed in a second region 180 of the screen. The user may select the NEXT button 184 or other appropriate button to advance form the first screen 160 showing the first portion of the wiring diagram 172, to a next screen 164 showing a second portion 186 of the wiring diagram 172 as shown in FIG. 12. As shown in FIG. 12, a second instructional step 188 for wiring the new HVAC controller according to the new wiring configuration may be displayed in connection with the second portion 186 of the wiring diagram 172. Similar to FIG. 11, the second portion 186 of the wiring diagram 172 may be displayed in a first region 178 of screen 160 and the at least one instruction step for wiring the new HVAC controller associated with the second portion 186 the wiring diagram 172 may be displayed in a second region 180 of the screen. The user may select the NEXT button 184 or other appropriate button to advance form the second screen 164 showing the second portion 186 of the wiring diagram 172 to a subsequent screen, as applicable, in the sequence of screens. In some cases, a BACK button 190 may be provided that permits a user to view a previous screen in the sequence.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respect, only illustrative. Changes may be made in details, particularly in matters of shape, size, and arrangement of parts without exceeding the scope of the disclosure. The disclosure's scope is, of course, defined in the language in which the appended claims are expressed.

What is claimed is:

1. A method of identifying a new wiring configuration for a replacement HVAC controller based on a current wiring configuration of a current HVAC controller, the method comprising:
   receiving a number of user inputs from a user via a user interface, the number of user inputs identifying:
      a current wiring configuration of a current HVAC controller; and
      a replacement HVAC controller selected from a provided listing of a plurality of different HVAC controllers that is to replace the current HVAC controller;
   determining a new wiring configuration for the selected replacement HVAC controller based, at least in part, on the current wiring configuration of the current HVAC controller as well as the selected replacement HVAC controller that is to replace the current HVAC controller, wherein the new wiring configuration for the selected replacement HVAC controller is different from the current wiring configuration of the current HVAC controller; and
   outputting the new wiring configuration to the user interface.

2. The method of claim 1, wherein the new wiring configuration that is output shows a wire mapping between the current wiring configuration and the new wiring configuration.

3. The method of claim 1, wherein the new wiring configuration that is output shows a wiring diagram for the new wiring configuration.

4. The method of claim 1, further comprising generating one or more user queries requesting additional information via the user interface based, at least in part, on the number of user inputs received from the user.

5. The method of claim 4, wherein the one or more user queries relate to one or more characteristics of an HVAC system controlled by the current HVAC controller.

6. The method of claim 5, wherein one of the user queries query whether the HVAC system includes both heating and cooling.

7. The method of claim 1, wherein if the determining step cannot resolve to a single new wiring configuration for the selected replacement HVAC controller, the method further comprises displaying one or more user queries on the user interface that are related to one or more characteristics of an HVAC system controlled by the current HVAC controller.

8. The method of claim 7, wherein the method further comprises resolving to a single new wiring configuration for the selected replacement HVAC controller based, at least in part, on one or more responses to the one or more user queries.

9. The method of claim 1, wherein the number of user inputs for identifying the current wiring configuration comprises a picture of the current wiring configuration uploaded by the user.

10. The method of claim 9, further comprising automatically identifying the current wiring configuration based, at least in part, on the picture.

11. The method of claim 1, wherein the determining step further comprises accessing a memory that stores one or more wiring configurations for a current HVAC controllers, along with one or more corresponding new wiring configurations for each of a plurality of replacement HVAC controllers.

12. A computer readable medium having stored thereon in a non-transitory state a set of instructions executable by a controller, the set of instruction causing the controller to execute a method comprising:
    receiving a number of user inputs from a user via a user interface, the number of user inputs identifying:
        a current wiring configuration of a current HVAC controller;
        a replacement HVAC controller selected from a provided listing of a plurality of different HVAC controllers that is to replace the current HVAC controller;
    determining a new wiring configuration for the selected replacement HVAC controller based, at least in part, on the current wiring configuration of the current HVAC controller as well as the selected replacement HVAC controller that is to replace the current HVAC controller, wherein the new wiring configuration for the selected replacement HVAC controller is different from the current wiring configuration of the current HVAC controller; and
    outputting the new wiring configuration to the user.

13. The computer readable medium of claim 11, wherein the new wiring configuration is output in a format for display on the user interface.

14. The computer readable medium of claim 12, wherein the new wiring configuration that is output shows a wire mapping between the current wiring configuration and the new wiring configuration.

15. The computer readable medium of claim 12, wherein the set of instruction also causes the controller to generate one or more user queries requesting additional information via the user interface based, at least in part, on the number of user inputs received from the user.

16. The computer readable medium of claim 12, wherein the set of instructions also causes the controller to generate one or more user queries requesting additional information via the user interface based, at least in part, on the number of user inputs received from the user identifying the current wiring configuration of the current HVAC controller.

17. The computer readable medium of claim 16, wherein the one or more user queries relate to one or more characteristics of an HVAC system controlled by the current HVAC controller.

18. The computer readable medium of claim 17, wherein one of the one or more user queries query whether the HVAC system includes both heating and cooling.

19. The computer readable medium of claim 1, wherein outputting the new wiring configuration comprises displaying a predetermined sequence of two or more screens, each screen comprising a visual indication of at least a portion of the new wiring configuration and each screen providing at least a one step of a set of steps for wiring the new HVAC controller according to the new wiring configuration.

20. A system comprising:
    a communications port for communicating with a user interface;
    a memory storing one or more wiring configurations for a current HVAC controller, along with one or more wiring configurations for each of a plurality of replacement HVAC controllers; and
    a controller operatively coupled to the communications port and the memory, the controller programmed to display on the user interface a plurality of wiring terminal labels and at least two replacement HVAC controllers available for selection by a user via the user interface, wherein in response to receiving a selection of one of the at least two a replacement HVAC controllers as well as a selection of two or more wiring terminal labels indicative of the current wiring configuration of the current HVAC controller, the controller is configured to reference the memory and determine a new wiring configuration for the selected replacement HVAC controller based, at least in part, on the selected two or more wiring terminal labels and the selected one of the at least two replacement HVAC controllers.

21. The system of claim 20, wherein the controller is further configured to output the new wiring configuration to the user interface via the communications port.

22. The system of claim 21, wherein if more than one new wiring configuration corresponds to the selected two or more wiring terminal labels and the selected one of the at least two replacement HVAC controllers, the controller is configured to display one or more queries on the user interface related to one or more characteristics of an HVAC system controlled by the current HVAC controller.

23. The system of claim 20, wherein the user interface is on a remote device, and the communications port communicates with the user interface over a network.

* * * * *